United States Patent [19]
Fuller

[11] Patent Number: 5,258,741
[45] Date of Patent: * Nov. 2, 1993

[54] PORTABLE ANTI-THEFT ALARM AND LOCKING DEVICE FOR VEHICLES

[75] Inventor: Kip L. Fuller, Littleton, Colo.

[73] Assignee: Innovision Technologies Group, Inc., Lakewood, Colo.

[ * ] Notice: The portion of the term of this patent subsequent to Oct. 8, 2008 has been disclaimed.

[21] Appl. No.: 770,129

[22] Filed: Oct. 2, 1991

Related U.S. Application Data

[63] Continuation-in-part of Ser. No. 525,759, May 18, 1990, Pat. No. 5,055,823.

[51] Int. Cl.$^5$ ............................................. B60R 25/10
[52] U.S. Cl. ................................. 340/426; 307/10.2; 340/546
[58] Field of Search ............... 340/426, 429, 546, 531; 70/209, 211, 212, 225, 226, 237, 454; 307/10.1, 10.2

[56] References Cited

U.S. PATENT DOCUMENTS

| | | | |
|---|---|---|---|
| 1,139,757 | 8/1915 | Fassett | 340/426 |
| 1,223,060 | 4/1917 | Louthan | 340/426 |
| 1,239,602 | 9/1917 | Johnston | 340/426 |
| 1,301,493 | 4/1919 | Niemeyer | 340/426 |
| 1,326,803 | 12/1919 | Tapley | 340/426 |
| 1,347,463 | 7/1920 | Jameson | 70/209 |
| 1,429,334 | 9/1922 | Furber | 70/209 |
| 1,448,658 | 3/1923 | Furber | 70/209 |
| 3,462,982 | 8/1969 | Moore | 70/209 |
| 3,742,743 | 7/1973 | Stoyanovitch | 70/209 |
| 4,103,524 | 8/1978 | Mitchell et al. | 70/209 |
| 4,304,110 | 12/1981 | Fain | 70/209 |
| 4,337,454 | 6/1982 | Iwata | 340/426 |
| 4,444,030 | 4/1984 | Dausch | 70/209 |
| 4,738,127 | 4/1988 | Johnson | 70/209 |
| 4,800,361 | 1/1989 | Greif | 340/426 |
| 4,829,797 | 5/1989 | Wu | 70/209 |
| 4,972,172 | 11/1990 | McLaughlin | 340/426 |
| 5,128,649 | 7/1992 | Elmer | 340/426 |

FOREIGN PATENT DOCUMENTS

| | | |
|---|---|---|
| 2580243 | 4/1985 | France . |
| 2579536 | 10/1986 | France . |
| 2134057 | 8/1984 | United Kingdom . |

Primary Examiner—John K. Peng
Assistant Examiner—Christine K. Oda
Attorney, Agent, or Firm—Donald F. Frei

[57] ABSTRACT

A portable bar is provided which attaches and locks to a vehicle steering wheel, preferably attaching to and extending tangentially from the top of the rim, and extends to where it is fully visible from outside of the vehicle. In the preferred embodiment, the bar is a hollow tube in which a pair of clamping members, one being a fixed section of the tube and the other part hinged thereto, surrounds and is locked about the steering wheel rim. A cavity in the tube protectively encloses, along with anti-saw-through bars and/or mace, alarm circuitry and the batteries therefor. Light and sound annunciators on the bar and a LED armed-condition indicator, which preferably flashes only when dark, are provided. A panic button on the outside of the tube manually triggers the alarm. Push button selectors enclosed in the tube are accessible only when the device is unlocked to arm and disarm the alarm or function automatically by contact with the rim upon locking and unlocking thereto. Alternatively, the light functions to serve as a flashlight or emergency flasher, are also provided. Remote disarming is provided with a receiver in the bar energized only upon detection of a disturbance to save power. The alarm in the bar, alternatively triggers in response to the sounding of a separate installed alarm to enhance security.

44 Claims, 6 Drawing Sheets

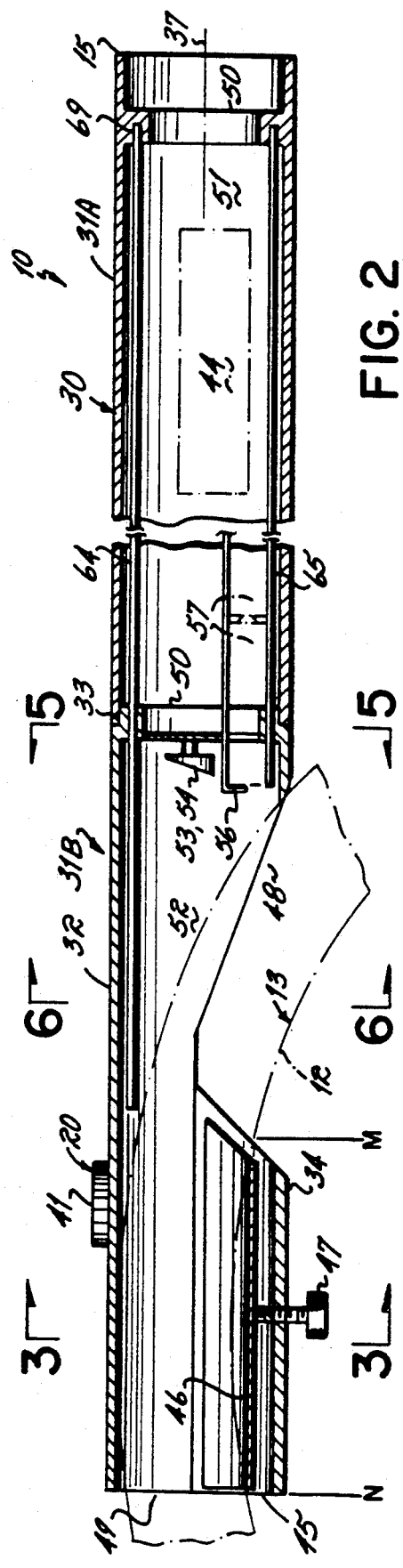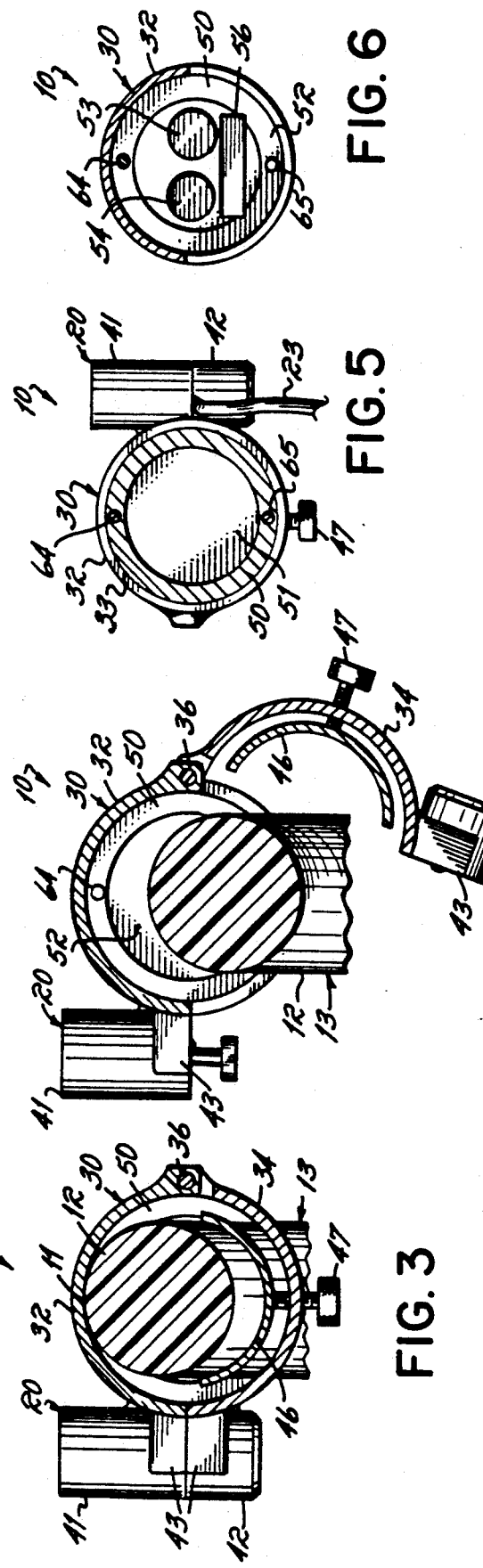

PORTABLE ANTI-THEFT ALARM AND LOCKING DEVICE FOR VEHICLES

This application is a continuation-in-part of U.S. Pat. application Ser. No. 07/525,759, filed May 18, 1990 now U.S. Pat. No. 5,055,823.

FIELD OF THE INVENTION

The present invention relates to portable locking devices for vehicles and more particularly to portable steering wheel locks for protecting vehicles and their accessories from theft.

BACKGROUND OF THE INVENTION

Prevention of vehicle and vehicle accessory theft has been a widespread concern among vehicle owners and users. Ignition locks and door locks with which vehicles are equipped by the manufacturer are but a weak deterrent to the vehicle thief.

Auxiliary locking devices which are portable in nature have been proposed to immobilize vehicles and to increase the difficulty through which the thief must go to render a vehicle capable of being removed. Such devices have been proposed in the form of tire locking clamps and blocks to inhibit the movement of vehicle wheels, as well as steering wheel locks to restrict the use of the vehicle's steering mechanisms. The function provided by these prior art locking devices has been to prevent some thieves from stealing certain vehicles by requiring increased effort to defeat these locking devices.

Portable steering wheel locks, for example, have been proposed which can be locked to a vehicle steering wheel so as to limit the rotatability of the steering wheel and thus the driveability of the vehicle. Such devices are, for example, shown in U.S. Pat. Nos. 1,429,334 of Furber, U.S. Pat. No. 4,444,030 of Dausch and U.S. Pat. No. 4,829,797 of Wu. Defeat of such locking devices by a thief requires an increase in time and effort in the removal of the vehicle. Such devices can be, and often are, broken, cut or otherwise defeated, and the vehicle thus ultimately stolen. Even when effective in preventing theft, the vehicles in which they are installed frequently suffer damage, in the form of broken windows or the mutilation of doors and door locks, or the removal of vehicle accessories. Portable steering wheel locks of the prior art have had many and various disadvantages, including being generally cumbersome, inconvenient to attach to and detach from the steering wheel, insufficiently visible to discourage break-ins, and relatively easy to pick, cut or otherwise remove from the vehicle. They also lack the capability of providing an alarm to focus attention on the actions of the would-be thief.

An alternative approach to portable locks which has been increasingly used to reduce vehicle theft, has been the use of vehicle alarms. Such alarms are usually built into the vehicle and function by activating a siren or other alarm indicator in response to some detected action by a thief such as the breaking into a vehicle, motion of the vehicle or of a vehicle component, etc. Vehicle alarms have also been known which are responsive to the movement of the vehicle steering wheel, as shown in, for example, Fassett U.S. Pat. No. 1,139,757.

Vehicle alarms of the prior art, as noted, are commonly permanently installed in the vehicle. As such, they have the disadvantage of protecting only a single vehicle, and cannot be moved from vehicle to vehicle when the owner drives several vehicles on an alternating basis or conveniently installed in a different vehicle when the owner sells or trades in his vehicle for a new one. Alarm systems which are permanently installed in specific vehicles are substantially more expensive than are portable alarms, most of the cost being that associated with the alarm system's installation rather than that associated with the alarm equipment itself. Since installed alarm systems protect a single vehicle, owners of more than one vehicle are required to purchase more than one alarm system if protection of more than one vehicle is desired. Furthermore, installed alarm systems of the prior art have been prone to installation errors and have a reputation for generating frequent false alarms and experiencing frequent system malfunctions. In addition, most installed alarms do not provide clear evidence to the thief that an alarm is present and armed within the vehicle. Accordingly, such alarm systems of the prior art do not effectively deter a thief until the alarm is sounded which may follow the infliction by the thief of significant damage to the vehicle.

Permanently installed automobile alarm systems generally have been inconvenient to install and use and are quite costly. This inconvenience and cost has deterred many automobile owners from installing and using such alarms.

The prior art has failed to provide an economical, and sufficiently light weight and portable, anti-theft device which can be easily attached to and removed from a vehicle by the owner, but which is highly resistant to unauthorized removal by a thief, and which is visible enough from the exterior of the vehicle to deter forced entry. Such devices of the prior art fail to provide a high degree of security for the vehicle, as well as for accessories within the vehicle, and fail to adequately protect against the destruction and removal of the locking device itself. The prior art has been particularly deficient in providing a portable locking device which can be easily attached to and removed from a vehicle by the owner but not by a thief, and which combines the signalling and deterrent advantages of an effective alarm with those of a portable vehicle locking device.

Furthermore, the features of vehicle alarms have not been provided or suggested in portable locking devices. The problems inherent in equipping such portable locking devices with alarms have, accordingly, not been addressed by the prior art. These problems include the protection of the alarm circuit itself from the tampering to which it would be exposed in a portable device and in providing a tamperproof power source adequate to power the alarm, particularly for vehicles not equipped with cigarette lighter power receptacles that are powered when the ignition is off. Particularly, the prior art has not provided a locking device having alarm features which are both tamperproof and adequately powered to provide full monitoring and alarm capabilities, and which does so without reliance upon the power source of the electrical system of the vehicle being protected.

Additional problems in providing portable steering wheel locking devices having electrical alarms involve providing adequate power. This is particularly true since many vehicles are not provided with cigarette lighters, or their lighters are not energized when the ignition is off, so as to allow the alarm to be powered from the vehicle battery. Batteries provided in the alarms themselves have less capacity and are easily run down with continuously flashing LEDs or with receivers used for remote arming or disarming.

Accordingly, there is a need for a portable vehicle anti-theft device which provides a high level of vehicle security, and which in an optional, preferred form combines the theft deterrent locking features of steering wheel locks with the full alarm capabilities heretofore found only in permanently installed alarm systems.

SUMMARY OF THE INVENTION

It has been a primary objective of the present invention to provide a vehicle anti-theft device which is portable and can be easily installed in, and removed from, a vehicle by the owner, but which provides increased security against its removal or defeat by a thief.

It is a particular objective of the present invention to provide a portable vehicle steering wheel locking device which functions to protect a vehicle in which it is installed against theft and also includes the capability of protecting itself from tampering or removal from the vehicle.

It is a further objective of the present invention to provide a portable vehicle steering wheel locking device which functions not only to prevent vehicle theft, but which activates an alarm in response to the activities of the thief, including attempts to steal a vehicle, attempts to tamper with the locking device, or attempts to remove vehicle accessories. It is a more particular objective of the present invention to provide a portable steering wheel locking device which is equipped with a fully powered and self-contained vehicle alarm, capable of protecting the vehicle, its contents and the steering wheel locking device itself.

It is an additional objective of the present invention to provide improved and more convenient means for arming and disarming an electric alarm in the portable vehicle steering wheel locking device.

It is another objective of the present invention to provide an alarm that can be remotely armed or disarmed. It is a more particular objective of the invention to provide for the conservation of batteries in the alarm device while allowing remote control of alarm arming and disarming features of the device. It is still further objective of the invention to provide for the conserving of the self-contained batteries for a portable steering wheel mounted alarm having a deterrent light or flashing armed status indicator.

It is still another objective of the present invention to provide a portable device that will enhance the security provided by an installed vehicle alarm system.

According to the preferred embodiment of the present invention, there is provided a portable vehicle locking device in the form of a bar which clamps tangentially to the rim of the steering wheel of the vehicle with at least one of the opposite ends of the bar extending tangentially a substantial distance from the section of the rim to which the bar is clamped, thereby effectively precluding the vehicle from being driven.

In a preferred form of the invention, the bar has a tubular clamping section formed of two hinged clamping members, one preferably being a rigid extension of the bar and the other being movable relative to the fixed member. Preferably, the movable member pivots about a longitudinal axis along one of its edges and positioned along one side of the bar on the fixed member so as to permit the two members to be selectively clamped and unclamped in encircling relationship to a small arcuate section of the steering wheel rim. Preferably, the two hinged clamping members are each generally semi-cylindrical, with one of the clamping members being fixed and integral with the bar in-line between the two opposite ends thereof. The inner semi-cylindrical wall of this fixed clamping member snugly embraces one-half of the uppermost arcuate section of the steering wheel rim to which the locking device is clamped. The other or movable semi-cylindrical hinged clamping member pivots on the hinge axis to partially encircle in snug gripping relation the other one-half of the arcuate section of the steering wheel rim being clamped, such that the clamped section of the steering wheel rim is fully encircled by the collective action of the fixed and movable semi-cylindrical clamping sections of the bar at the point where the bar is attached, enabling the bar to extend tangentially from the steering wheel a substantial distance. So positioned, the projecting end of the bar will encounter solid stationary portions of the vehicle, such as the seat or windshield, if the steering wheel is turned, preventing the wheel from rotating through a large enough angle to allow the vehicle to be driven.

In accordance with further features of the invention, the bar is provided with an extended length tubular structure having sufficient volume to house alarm electronics and to house sufficient battery capacity to fully power the electronics to perform the alarm monitoring function for lengthy periods of time and to activate intense sound and light annunciators without dependence on the vehicle battery. An alarm may be omitted in certain embodiments of the invention without departing from this and other features of the invention. The enclosed protected space, for example, is effective to secure articles to be protected as well as mechanical and other structures, to inhibit removal of the device and enhance the security it provides, for example, a pressurized personnel repellant gas such as mace, which will be released if the device is cut.

The alarm containing embodiments may be equipped with sound, impact, motion, air pressure, or vibration detectors which will cause the alarm to trigger in response to any such disturbance as may be associated with attempted vehicle theft. Disturbances of the locking bar itself are caused to signal an alarm condition. The alarm annunciators are provided with high intensity sound and light to provide an indication that tampering with the steering wheel locking device has occurred or that the locking device or the vehicle are being moved. The annunciators operate at a level which will provide a hostile environment within the vehicle for the thief to remain, thus deterring continued efforts to steal the vehicle. When a window of the vehicle is broken or the vehicle is otherwise open, the alarm will be particularly audible from outside of the vehicle.

The hinged clamping members of the tubular clamping section, when closed, form a tube which is preferably in-line with, and an extension of, the generally tubular bar, making the entire assembly appear as an integral cylindrical tube. Preferably, the tubular clamping section has a diameter slightly greater than the standard thickness of the rim portion of a vehicle steering wheel. As such, the two hinged clamping members of the clamping section snugly encircle the steering wheel rim at at least two spaced apart points corresponding to the opposite ends of the clamping section. The hinge axis of the pivoted hinged clamp member extends along a side wall of the tubular clamping section tube on the side of the steering wheel facing the driver and locks with a lock positioned on the side of the steering wheel facing the vehicle windshield. The lock requires a key to unlock it which is insertable downwardly from above the steering wheel rim. The key lock is thereby positioned in a location and orientation where it is difficult for a thief to pick, drill, strike, or otherwise attempt to defeat the key lock. Furthermore, with the lock so positioned, using force on the lock will tend to rotate the bar somewhat on the steering wheel rim toward the vehicle windshield, making the lock even less accessible to the thief.

The steering wheel locking device, in one embodiment, is further provided with a mechanical cable securable between the locking member and an automobile accessory such as a cassette player. The device so equipped locks the accessory against removal when the locking device is clamped to the steering wheel rim. Furthermore, the alarm circuit will provide warning signals to protect, not only the vehicle, but vehicle accessories and the steering wheel lock itself from removal.

Controls for arming and disarming the alarm are positioned within the cavity of the extended tubular portion of the bar so as to be accessible only by a user and only when the locking device is removed from a vehicle steering wheel. In addition or in the alternative, the arming of the alarm is tied into a switch included in the steering wheel lock device to be activated upon closure of the clamping section around the steering wheel rim or the locking of the key lock itself which is incorporated in the clamping section. As such, the steering wheel lock device protects the security and integrity of the alarm. The arming and disarming controls for the alarm are thereby inaccessible to a thief when the steering wheel locking device is positioned and locked to the rim of a steering wheel of a vehicle.

Arming buttons are provided for the manual arming and disarming controls. These buttons are positioned within the clamping section of the bar and are inaccessible when the bar is clamped and locked to a steering wheel rim. The buttons themselves are preferably shielded by a guard plate positioned so as to prevent the use of a wire or other elongated object to disarm the alarm by insertion between the automobile steering wheel rim and the clamping section of the device when the device is locked to the steering wheel.

In accordance with further features of the invention, the tubular steering wheel locking bar includes a plurality of elongated rods longitudinally disposed therein and spaced circumferentially about the periphery thereof. The elongated roller bars are preferably mounted for rotation about their longitudinal axes, are made of hardened steel, so that they will rotate should a thief attempt to saw transversely through the steering wheel lock bar, thus resisting defeat by the action of a saw. If rotatably mounted, the roller bars preferably have a roughened surface. If non-rotatable bars are employed to resist sawing, a smooth, hard plated surface is preferable.

Further, since the steering wheel locking device is highly visible from outside of the car, and is provided with a flashing LED, it further alerts a potential thief to the presence of the locking or alarm device and thereby deters breaking into the vehicle.

In a preferred embodiment, the audible and visual annunciators include a loud 110 decibel sounding device as well as a bright halogen lamp which are activated when the alarm is triggered. This occurs within the car itself, thus making it unpleasant for the thief to remain in the vehicle. Furthermore, should the alarm trigger inadvertently through some disturbance which does not involve breaking into the vehicle, the sound emitted will be far less annoying than with prior art vehicle alarms since it is confined totally within the vehicle rather than, as is the case with conventional vehicle alarms, sound externally of the vehicle. Nonetheless, should the owner wish that an external audible alarm be provided, an optional siren attachable to the outside of the vehicle is provided which is activated in response to the annunciators on the locking device. A detector which responds to sounding of the device within the automobile causes the external annunciator to emit an externally perceivable loud sound.

The steering wheel locking device is also provided with a capability of being used as a flashlight or as an emergency hazard warning light. A switch, hidden when the device is locked to a steering wheel but otherwise accessible, turns the light continuously on for use as a flashlight, or alternatively causes the light to flash for use as a road warning device. In the flashing mode, a stand attachable at one end of the bar near the clamping section, and a translucent red lens cover attachable at the other end to cover the lens, adapts the device to serve as a self-standing warning flasher. In addition, a panic button is further provided to allow for the manual activation of the alarm by the owner in an emergency for personal protection.

In a further embodiment of the present invention, the portable device is combined with additional alarm and power components installed within the vehicle. With such an embodiment, the portable device connects to electrical circuitry within the vehicle so that an alarm included either in the device or installed in the vehicle, and preferably both, is functionally dependent, either for arming, disarming or activation, on making or breaking of the connection. This embodiment preferably includes a 12 volt power jack which enables the device to connect to the vehicle power supply, for example, through the cigarette lighter plug. When such a connection is made, the alarm device arms automatically after a time delay of, for example, 20 seconds. In its preferred form, this embodiment includes a control box installable in the vehicle engine compartment which may include a voltage drop sensor, a motion sensor, an emergency flasher connection, remote radio frequency electronics, a starter or ignition cut-off, and an additional 120 db siren.

In its various embodiments, devices of the present invention provide an improved portable locking device for vehicles. The tangential clamping of the bar to the rim of the steering wheel provides a strong connection which makes it difficult for a thief to apply enough leverage to the device to easily remove it from the rim. The device, so attached, does not interfere with the structures of the steering wheel radially inward of the rim such as the spoke, horns, switches, air bags and other devices which vary from vehicle to vehicle. The tangential projection of the device, when attached to the uppermost portion of a steering wheel rim, places it entirely within view from outside of the vehicle providing maximum deterrent to potential thieves.

The straight bar embodiments of the invention are most convenient to use and store when not in use, and allow the device to be easily transported and to serve as a flashlight or emergency warning device, making important use of the electrical capabilities which may be included with certain embodiments of the invention.

The tubular structure and other hollow configurations or portions of certain embodiments of the device provide a protective enclosure which is otherwise useful for holding valuables or for holding other security components such as a security alarm, remote control and other communications circuitry, and self-contained power supplies for operating alarms and other circuitry.

In the embodiments in which alarms are provided, the combination provides enhanced security for the vehicle and its accessories by providing alarm indications of attempts not only to move the vehicle but to tamper with the locking device, thus making the locking features themselves more secure. The lock and other switches and protective enclosures, in turn protect the alarm from tampering and defeat.

Further in accordance with embodiments of the present invention, an alarm arming and disarming switch is provided that arms and disarms the alarm of a steering wheel locking device automatically when the device is attached to a steering wheel. This is preferably accomplished by providing an arming actuator that is activated when the device makes locked contact with the steering wheel.

Additionally, in accordance with preferred embodiments of the invention, the batteries of battery operated alarms are conserved by activating an armed status flasher only in dark conditions by making the indicator responsive to the output of a photocell. Energy for remote arming and disarming versions is conserved by providing a receiver that is energized by the batteries of the locking device only when a theft is detected, thereby allowing disarming within a short period of time after theft detection.

Further battery conservation is provided for remotely disarmable steering wheel mounted locking devices and alarms by energizing a receiver necessary to receive a remote signal only upon the detection of an attempted theft.

A further embodiment of the invention provides for the enhancement of the security of an installed or built-in alarm system of a vehicle by responding sympathetically only to activate in response to the generation of an alarm signal by the installed alarm.

The device in the embodiment in which it is combined with installed components gives enhanced security for the vehicle in which the additional components are installed without defeating the capabilities of the portable portion of the device to be used in the vehicle or in other vehicles with the features and advantages set forth above. Furthermore, by making the installed alarm responsive to disconnection of the locking device or removal of the locking device from the steering wheel, with or without the alarm on the locking device, the effectiveness of an installed alarm may be enhanced in that removal of the device is necessary for the automobile to be driven.

These and other objectives and advantages of the present invention are more readily apparent from the following detailed description of the drawings in which:

BRIEF DESCRIPTION OF THE DRAWINGS

FIG. 2 is a cross-sectional side view of the device of FIG. 1;

FIG. 3 is a cross-sectional view of the device of FIG. 2 taken along line 3—3 of FIG. 2 showing the steering wheel in cross-section;

FIG. 4 is a view similar to FIG. 3 illustrating the device in an unlocked condition;

FIG. 5 is a cross-sectional view of the anti-theft device along line 5—5 of FIG. 2;

FIG. 6 is a cross-sectional view of the anti-theft device along line 6—6 of FIG. 2;

DETAILED DESCRIPTION OF THE DRAWINGS

Figure 1:
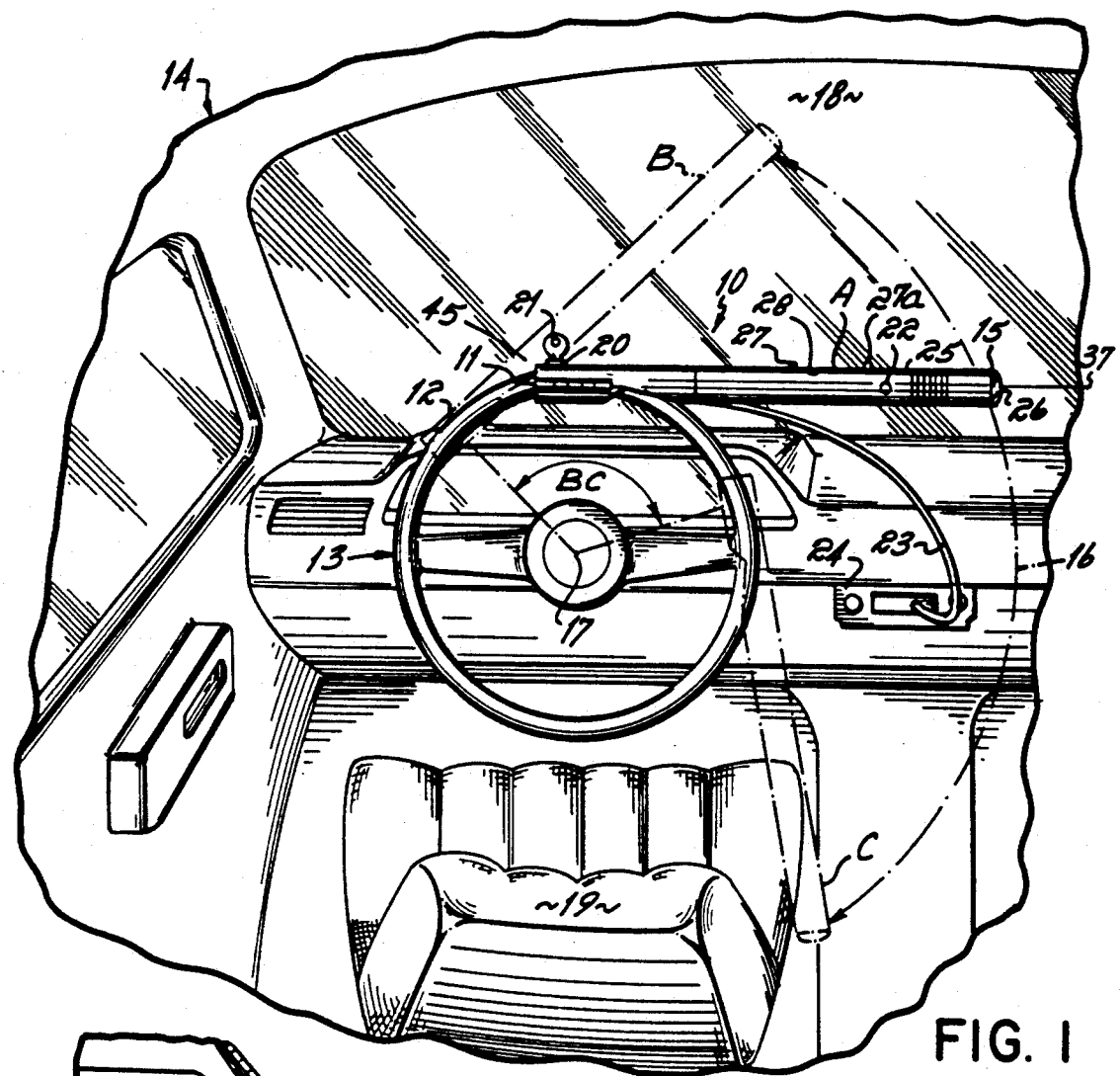
FIG. 1 is a perspective view of the interior of an automobile looking forward from the area of the driver's seat and showing an anti-theft device, according to principles of the present invention, installed at the top of the automobile steering wheel rim.

Referring to FIG. 1, an anti-theft device 10 according to the principles of the present invention is illustrated secured at point 11 to the upper portion of the rim 12 of a steering wheel 13 of a vehicle such as automobile 14. Secured in this preferred manner, the device 10 functions to render automobile 14 essentially undriveable by limiting the rotation of the steering wheel 13 and the capability of the vehicle 14 of being driven. Also, as so positioned, the device 10 presents a clearly visible indication to a prospective thief that a security device is present within the vehicle, thus providing deterrent before a breaking and entry of the vehicle 14 is attempted and damage thereby done to the vehicle 14.

Figure 1A:
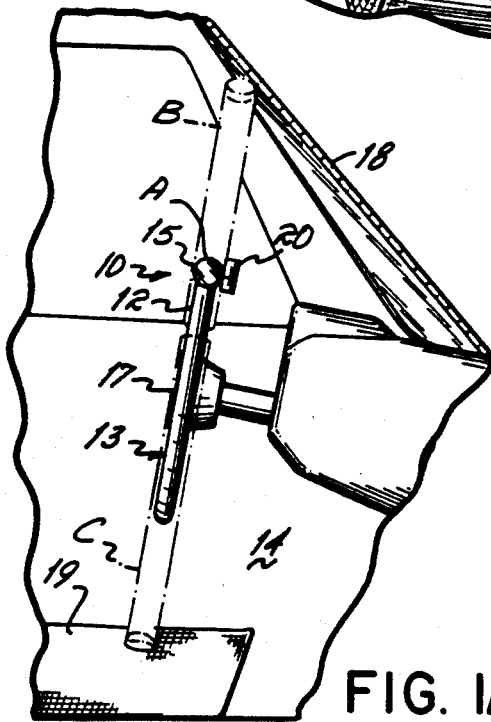
FIG. 1A is a right side view of the automobile interior and the installed anti-theft device of FIG. 1.

The device 10, positioned as illustrated in position A of FIG. 1, is oriented horizontally so as to extend tangentially from the point or section 11 on the top of the rim 12 such that a remote end 15 of the device 10 is, in position A as shown, displaced tangentially, and extends horizontally, to the right of the point 11 on the rim 12. The device 10 is rigidly locked to the rim 12 at the rim section 11 so as to be constrained to move in the plane of the steering wheel rim 12, along a circular path 16 about the axis 17 of the steering wheel 13, should an attempt be made to rotate the steering wheel 13. The arc of the circular path 16 is of such radius about the axis 17 as to intersect various fixed structures which are secured to, and generally fixed with respect to, the frame of the automobile 14. As is illustrated in FIGS. 1 and 1A, the remote end 15 of the device 10 will contact these fixed structures of the automobile 14, such as the automobile windshield 18 when the steering wheel 12 is rotated to the left (counterclockwise) to move the device 10 to position B, or such as the driver's seat 19 when the steering wheel 13 is rotated to the right (clockwise) to move the device 10 to position C. Accordingly, when so secured to the steering wheel 13 as illustrated in FIGS. 1 and 1A, the motion of the steering wheel is limited to the angle BC of FIG. 1. In its preferred and illustrated embodiment, only one end 15 of the device 10 extends tangentially from the rim 12, but extension of both ends of the device 10 may be employed.

The device 10 is securable to, and removable from, the steering wheel 13 by the operation of a lock, which is preferably a key operated lock 20. When secured to an automobile steering wheel 13 as illustrated in FIGS. 1 and 1A, the lock 20 is located behind the point 11 at the top of the rim 12 of the steering wheel 13, opposite the driver and toward the windshield 18 on the forwardly facing side of the steering wheel 13. In this position, the lock 20 is generally in an area bounded by the steering wheel 13, the windshield 18 and the automobile dashboard. As such, the clearance surrounding the lock 20 is limited, thus rendering it difficult for a thief to tamper with or otherwise attempt to break or defeat the lock 20 by striking, drilling or picking it. Furthermore, the keyway for the lock 20 is not directly visible except at a wide angle near the top of the steering wheel rim 12. The lock, so positioned, is nonetheless convenient to the owner of the vehicle 14 in that the lock 20 is easily accessible from the top with the key 21 as shown in FIG. 1. With the lock 20 being of the key-operated type, the key 21 is required at least to unlock the device 10 from the steering wheel rim 12.

The device 10 houses within it electronics along with sufficient battery capacity effective to monitor intrusion into or attempted theft of the vehicle 14 for an extended period of time, and to generate both audible and visual alarm signals when disturbances indicative of alarm conditions are sensed. The alarm condition may be any detectable disturbance determined to be a reliable indication of attempted theft of the vehicle 14, such as impact to or motion of the steering wheel 13, a sound of a predetermined level sensed within the vehicle 14, or other such condition. The alarm condition is preferably some form of disturbance to or detectable at the device 10.

In the illustrated embodiment, a microphone 22 is provided for detecting internal vehicle sound levels or other disturbance within or of the vehicle 14, while a tamper switch 78 (FIG. 8) is provided which detects motion or other disturbance of the device 10. The alarm signal generated in response to detection of an alarm condition activates annunciators which include an audio transducer 25 positioned behind a sound penetrable grid which, when attached in position A to point 11 of the rim 12, faces rearwardly within the vehicle 14 so as to project high intensity sound, at an intensity level of preferably in excess of 100 db, preferably at least approximately 110 db, from the device 10 throughout the passenger compartment of the vehicle 14. The sound level from the transducer 25 is high enough to attract attention, particularly when a door of the vehicle 14 is open or a window of the vehicle 14 is broken. The sound is also loud enough to render occupancy of the vehicle 14 unpleasant so as to encourage an unauthorized person in the vehicle 14 to depart quickly. In addition, the device 10 has, at the free end 15 thereof, a bright halogen lamp 26 positioned behind a lens. The lamp 26 is sufficiently bright to attract attention, particularly at night, and to illuminate and expose anyone inside the vehicle 14. Thus, in the event an alarm condition is detected, high energy sound will fill and emanate from the vehicle 14 and bright light will be visible through the windows of the vehicle 14.

The device 10 is further provided with a tether or cable 23 which is securable at one end to the device 10, and at its other end to an accessory 24, such as a cassette player, within the vehicle 14. The cable 23 secures the accessory 24 to the vehicle 14 and facilitates detection by the alarm within the device 10 of attempted theft of the accessory 24, either through mechanical or electrical interaction with the cable 23.

In addition, when alarm circuitry within a device 10 is armed, an LED 27 provided on the top of the device 10 will periodically flash, generating a warning light clearly visible from outside the vehicle 14 to a person near the vehicle 14. The flashing LED provides a deterrent to a potential thief by informing the thief that an activated alarm is present within the vehicle 14 and drawing his attention to the steering wheel lock clamped to the rim of the steering wheel. A photocell 27a is provided on the device 10, preferably on the side facing the windshield 18, to interrupt power to the LED 27, preventing it from flashing when the vehicle is parked outdoors in daylight, to conserve battery power.

For the personal protection of the occupants of the vehicle 14, there is furnished on the top of the device 10, a panic button 28 which provides the owner or user of the vehicle 14 with the ability to quickly manually activate the alarm annunciators 25 and 26 in the event of an emergency warranting the summoning of immediate emergency assistance or the attraction of immediate attention.

The construction of the device 10 is best understood by reference to FIG. 2. The device 10 is formed of a hollow metal tube or tubular bar 30 which includes a relatively long steel tubular section 31A and a relatively short cast aluminum steering wheel clamping section 31B. The clamping section 31B includes a stationary member 32 which is rigidly connected to the steel tubular section 31A at a joint 33, and a semi-cylindrical movable member 34. The clamp section 31B, formed by the members 32 and 34, has a generally cylindrical wall which is an extension of the cylindrical wall of the steel tubular section 31A. The movable member 34 is preferably complementary to the cast stationary member 32, together with which it can form a closed cylinder about the steering wheel rim 12 when clamped thereto. The steel tubular portion 31A of the tube 30 generally houses the electrical and electronic alarm components of the device 10 and will function to project tangentially from the point 11 on the rim 12, supporting the free end 15 outward of the rim 12 a substantial distance. The cast aluminum portion 31B formed of parts 32 and 34 clamps and locks the device 10 to the steering wheel rim 12. The cast aluminum fixed clamping member 32 extends between the joint 33 and an opposite end 35 of the bar 30.

The movable clamping member 34 is preferably hinged to the fixed member 32 so as to pivot about a hinge pin 36 (FIGS. 3 and 4) along one side of the tubular wall of the section 31B joining the members 32 and 34. The tube 30 has a longitudinal axis 37 which, when the device 10 is attached to the steering wheel 13 as shown in FIG. 1, is generally tangential to the center line of the steering wheel rim 12 at the point 11 on the top of the steering wheel 13. The hinge pin 36 is parallel to the longitudinal axis 37 of the tube 30 extending longitudinally along the wall of the tube of which the bar 30 is preferably formed. The hinged relationship of parts 32 and 34 is better illustrated in FIGS. 3 and 4.

The two semi-cylindrical members 32 and 34 which are hinged together at pin 36 form, when closed about the rim 12 of the steering wheel 13, the clamping section 31B in the form of a cylindrical tube encircling the steering wheel rim 12 at point 11, as shown in FIG. 3. When clamped in this closed position, the semi-cylindrical members 32 and 34 of the bar 30 are locked by the lock 20. The lock 20 is contained in a housing formed in two parts, 41 and 42, each cast into a respective one of the semi-cylindrical members 32 and 34 of the tube 30. The lock 20 preferably is spring biased to snap into a locked condition when the hinged member 34 is closed. A key is then required to unlock it. Otherwise, the lock may be a conventional but high quality anti-pick lock.

Figure 2A:
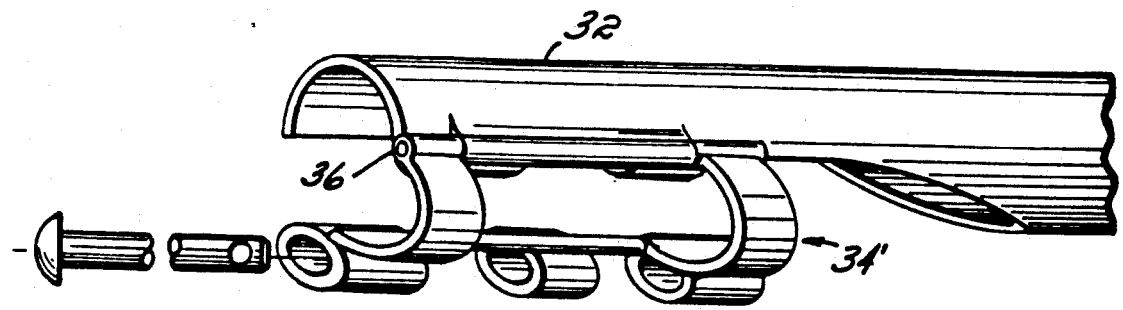
FIGS. 2A-2D are cross-sectional views illustrating alternative details to those of portions of FIG. 2.
Figure 2B:
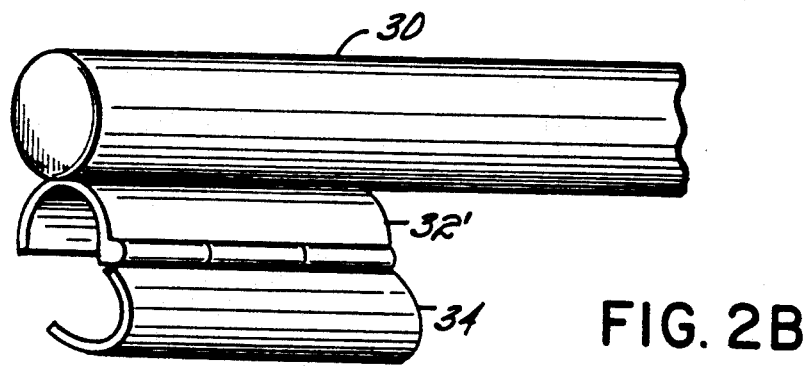

In preferred embodiments, the clamping section 45 is formed in-line with the bar 30 between the opposite ends 15 and 35, and particularly between the tubular section 31 and the end 35. The semi-cylindrical movable clamping member 34 is of sufficient length so as to cooperate with the fixed clamping member 32 to encircle the rim of the steering wheel 13 at two points M and N spaced along the rim 12 of the steering wheel 13 about 3 inches apart to support the device to the rim 12 with sufficient rigidity tangent to the rim 12. It will be appreciated that the movable member 34' could be formed of a pair of spaced rings pivotably attached to the fixed member 32 and both locking at their free ends around the rim 12 as shown in FIG. 2A. Further, the movable clamping member could be slidably or otherwise movably attached to the fixed member 32 other than with a hinge. In addition, though preferably positioned in-line with the bar, the clamping section could be formed of a fixed semi-cylindrical tube or other clamping members 32, connected to the side of the bar (as shown in FIG. 2B). As such, the long axis of the bar can be tangentially disposed at a point radially outwardly beyond the rim 12 of the steering wheel 13 when locked to the rim 12.

Optionally, there is also provided, cast into the respective members 32 and 34, adjacent to and integrally cast with the housing parts 41 and 42, a two part switch housing 43. In certain embodiments of the invention, an arming switch is provided in the housing 43 to arm, and optionally also disarm, the alarm electronics contained within the outer tube section 31 of the bar 30. The electronics are illustrated in FIG. 2 as circuit board 44 contained within the steel outer tubular portion 31 of the tube 30.

To insure that the tubular members 32 and 34 of the clamping section of the bar 30 tightly grip the rim 12 of the steering wheel 13 when clasped thereto, a curved plate 46 is provided within the movable clamping member 34. The plate 46 is tightenable against a rim of the wheel 13 by a security screw 47, such as is available from the Tamperproof Screw Co., Inc. of Hicksville, N.Y., threadably secured to the hinged portion 34 to move the plate 46 toward and away from the section 34.

Figure 2C:
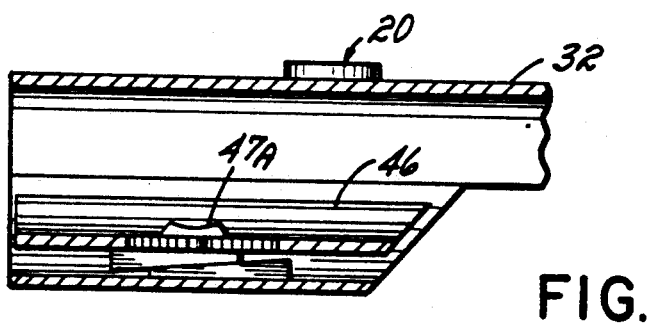
Figure 2D:
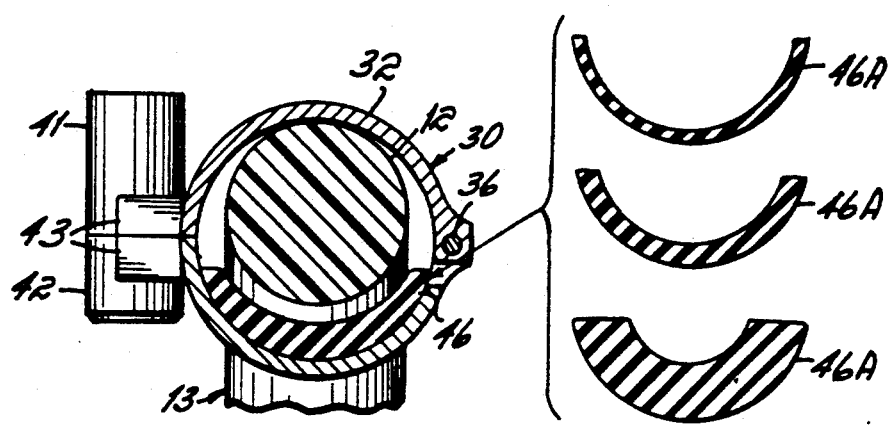

Preferably, the plate is constructed such that it cannot be loosened when the device 10 is locked to a steering wheel rim 12. This enables the locking device to be used with steering wheels having different thickness rims. In the alternative, the adjustability of the plate 46 may be provided with a slidable wedge 47A or other such mechanism, as shown in FIG. 2C, which is only accessible when the device is unlocked from the steering wheel rim 12. As a further alternative, replaceable spacers 46A may be provided of different sizes to fill the space to accommodate wheels 13 of different sizes as shown in FIG. 2D.

When locked in the closed position shown in FIG. 3, the tube 30 takes on the form shown in FIG. 2, which is a generally cylindrical tube with a pair of openings 48 and 49 therein to allow the steering wheel rim 12 to pass therethrough so that the device 10 can be locked to the wheel rim 12. The opening 49 is, in the embodiment shown, at the end 35 of the bar 30, in the end of the cast section 31B opposite the steel tubular section 31A, while the opening 48 is in the side of the cast section 31B of the tube 30 between the movable member 34 and the fixed member 32. As shown in FIG. 4, the semi-cylindrical member 34, when the lock 20 is unlocked, moves to an open position relative to member 32 to release the steering wheel rim 12. In this open position, the rim 12 can be inserted into an opening formed by the openings 48 and 49 and the channel-like space therebetween, formed by the interior of the fixed member 32, and otherwise covered by member 34 when in its closed position.

A bulkhead 50 shown in a cross-sectional view of FIG. 5 is provided at the juncture 33 between the steel outer tubular portion 31 of the tube 30 and the cast aluminum tubular inner clamping section member 32 to reinforce the joint 33 and to separate a cavity 51 within the hollow tube 31, which, in one preferred embodiment, houses the electronics 44, from a cavity 52 within the section 32 which receives the rim 12 of the steering wheel 13. Mounted to the bulkhead 50 so as to be accessible only from the cavity 52 within the cast aluminum section of the tube 30 formed of members 32 and 34, are two manually actuatable switches 53 and 54 (FIG. 6). Switch 53 provides for the arming and disarming of the alarm while switch 54 provides for a selection of various modes of operation of the circuitry 44. The switches 53 and 54, in that they are only accessible through the cavity 52, are inaccessible when the device 10 is locked to the steering wheel rim 12, as shown in FIGS. 2 and 3. Accordingly, arming and disarming of the alarm circuitry 44 can only be achieved when the device 10 is unlocked from the steering wheel 13. Similarly, the device 10 may not be disarmed unless it is unlocked and removed from the rim 12 of the steering wheel 13.

To prevent the buttons 53 and 54 from being operated by a thief through the use of a wire inserted around the rim 12 of the steering wheel 13 at the opening 48, a button guard shield 56 is provided. The shield 56, in addition, functions as a battery guide and holds in place batteries for the operation of the electronics 44 and the annunciators 25 and 26. The cavity 51 is of sufficient volume to not only house the electronics 44 but also to house batteries of sufficient capacity to power the audio and visual transducers 25 and 26, respectively. This capacity should be sufficient to operate the LED 27 and circuitry 44 for several days, preferably several hundred hours, and then to power a 110 db siren and simultaneously energize a bright halogen lamp for several minutes following such an extended period of monitoring. Preferably, six alkaline C or D cells connected in series, or a plurality of 9 volt batteries connected in parallel are employed. Six or twelve AA cells may also be used.

The tube of the locking device 10 is physically protected against removal by an attempt to saw through the tube 30 by the provision of a plurality of hardened steel rods or roller bars, such as bar 64, spaced parallel to the axis 3 of the tube 30 around its periphery, as shown in FIGS. 2 and 5. These roller bars 64 are preferably mounted to rotate on their axes so that, if engaged by a saw blade in an attempt to saw through the tube 30, they will rotate with, and not be abraded or cut by, the saw blade. The bar 64 thus inhibits the ability of the blade to cut through the tube 30. The bar 64, for example, is rotatably mounted in a bushing surface formed in a ring 69 formed integrally of the forward end of the tube section 31. The bar 64 also extends through a hole in the bulkhead 50 in the middle portion of the tube 30, where it is also rotatably supported by a bushing, to approximately the position of the lock 20 where the bar 64 terminates to provide clearance for the rim 12 of the steering wheel 13. Similarly, the roller bar 65, in the lower portion of the tube 30, is also rotatably mounted through the ring or bulkhead 50 through which it extends to terminate just short of the hole 48 in the tube portion 32 to provide clearance for the rim 12 in the steering wheel 13. In addition, the hinge pin 36 extends the length of the tube 30 along the front side thereof facing the driver. This hinge pin 36 is also made of hardened steel and is sufficiently loosely fitted so as to rotate when engaged by a moving saw blade. This pin 36 extends the length of the hinge junction of the two members 32 and 34, through the central bulkhead 50 to which it is rotatably supported in a bushing formed integrally thereof, and to the forward ring 69 in which it is also rotatably supported.

In an alternative embodiment, instead of alarm electronics in the cavity 51, a sealed canister of pressurized personnel repellant gas such as Mace may be fitted therein, which, if a cutting of the bar is attempted, will release the mace onto the intruder.

Figure 7:
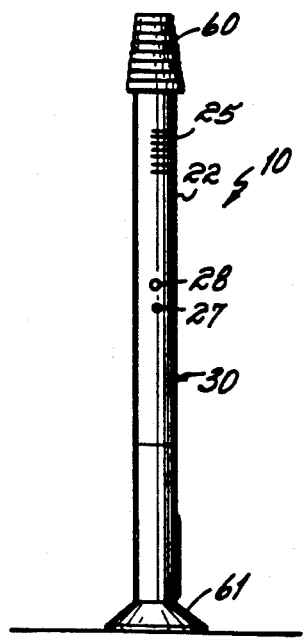
FIG. 7 is a view of the device in FIG. 2 in FIG. 4 in use as an emergency warning device.

Referring to FIG. 7, the device 10 is shown functioning as an emergency warning device. In order to provide additional utility for the device 10, the halogen lamp 26 is capable of being used as a flashlight. For this purpose, the switch 54 is a three position push-button operated switch which, when pushed once, will activate the lamp 26 to function as a continuous light. A second depression of the button 54 will cause the light to flash, rendering the device 10 useful as an emergency warning flasher, for which use, the addition of a red lens cover 60 to cover the lamp 26, and the provision of a stand or base 61 to support the device 10, is provided as shown in FIG. 7. A third depression of the switch 54 will turn off the lamp 26.

Figure 8:
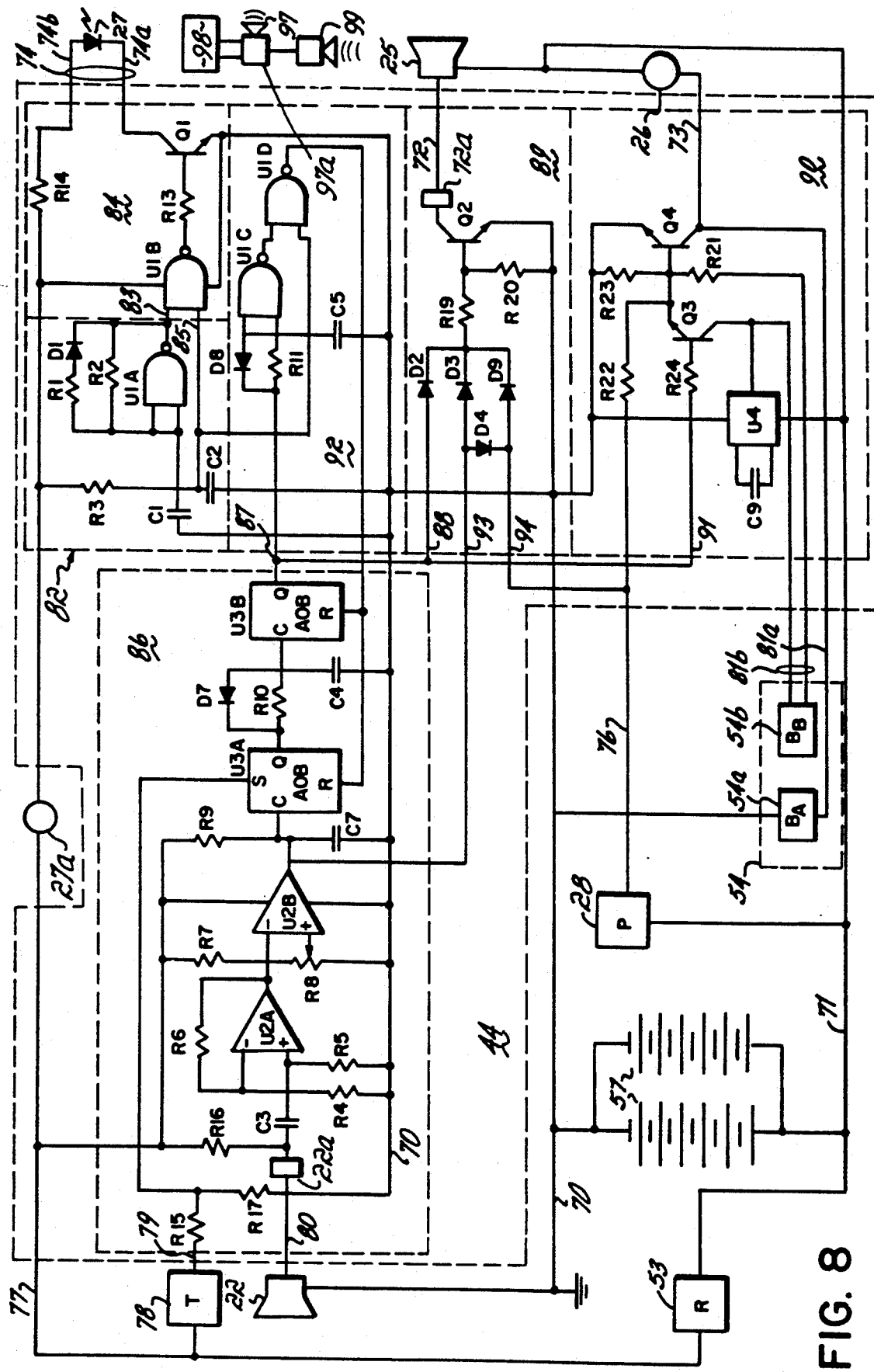
FIG. 8 is a block and schematic diagram of the electric circuitry of the device.

The electronic circuitry contained within the tube portion 31 is set forth diagrammatically in FIG. 8. As shown in FIG. 8, the plurality of batteries 57 generally constituting a 9 volt DC power supply is illustrated as including a pair of 9 volt batteries connected and parallel. The batteries 57 may be 6 or 12 AA size batteries or 6 C or D size batteries, or any other combination capable of powering the electronics of the device 10 adequately. In the structure shown in FIG. 2, the plurality of 9 volt batteries 57 is physically contained in the space beneath the shield 56 of the steel outer tube section 31.

To the top of the shield 56 within the tube 31 is mounted the printed circuit board 44 containing the circuitry so designated as 44 in FIG. 8. The printed circuit board 44 is provided with a common conductor or ground 70 which is connected to the negative terminal of the battery 57. The positive leads from the batteries 57 are connected to a positive voltage line 71 which is in turn connected to a lead of the siren or horn 25 and to a lead of the halogen lamp 26. A second lead of the siren 25 is connected to an audio output terminal 72 of the circuit 44 while the other lead of the lamp 26 is connected to a video output lead 73 of the circuit 44. The LED 27 is connected to a pair of output leads 74a, 74b of the circuit board 44. The 9 volt positive lead 71 is also connected through the panic push-button switch 28 to a panic switch input terminal 76 of the circuit 44, and also through the arming and disarming push-button 53 to the arming signal input 77 of the circuit 44. The arming terminal input 77 of the circuit 44 is also connected through a tamper switch 78 to a tamper signal input 79 of the circuit 44. The microphone 22 is connected between the microphone input 80 of the circuit 44 and the common ground terminal 70.

The arming and disarming push button 53 is a push-on/push-off push-button. When the switch 53 is ON, 9 volt DC power from the battery 57 is applied to the conductor 77 of the circuit 44 and also to the tamper switch 78. The push-button 54 is a push-on to energize the A contacts 54a thereof, push again to energize the B contacts 54b thereof and to open the A contacts 54a, and push again to turn both sets of contacts 54a and 54b off. The contacts 54a, when closed, connect a terminal 81a of the circuit board 44 to ground for continuous energization of the lamp 26, while the closing of the contacts 54b connect a pair of contacts 84b, the inputs to the circuit board 44 to energize a flasher circuit for the light 26.

Connected in series in the arming signal line 77 at the input to circuit 84 is the photocell 27a. The photocell 72a operates to interrupt power to the circuit 84 in ambient bright light conditions, permitting the LED 27 to flash only when sufficiently dark for it to be noticed.

The circuit 44 includes a pulsing circuit 82 which generates a pulsed signal to energize the LED 27, after a time delay of 20 seconds, from the time that power is applied to it. The circuit 82 includes a NAND gate U1A which has its inputs connected through a capacitor C1 to ground. The output of the NAND gate U1A is connected to the input 83 of an LED driver circuit 84. A resistor R2 is connected from the inputs of the NAND gate U1A to the output of the gate U1A. Connected and parallel with the resistor R2 and the gate U1A is a series circuit consisting of a diode D1 having its cathode connected through a resistor R1 to the inputs of gate U1A and its anode connected to the output of gate U1A.

The 20 second delay for the pulsing circuit 82 is developed by an RC network which includes a resistor R3 and a capacitor C2 which are connected respectively in series between the armed signal input 77 and the common or ground lead 70. At the junction of the resistor R3 and capacitor C2 a second input 85 of the driver circuit 84 is connected. The inputs 83 and 85 are connected within the circuit 84 of the inputs of a NAND gate U1B which has its output connected through a resistor R13 to the base of a transistor Q1. The emitter of the transistor Q1 is connected to the negative power terminal of the NAND gate U1B and to the common conductor 70, while the positive power terminal of the NAND gate U1B is connected to the arming signal line 77. The collector of the transistor Q1 is connected to an output terminal 74a which connects to the anode of the LED 27. The cathode of LED 27 is connected to an output of the circuit 84 at terminal 74b. The terminal 74b is connected through the circuit 84 through resistor R14 to the arming signal line 77.

The circuit 44 includes the alarm detection circuit 86 which has one input connected through a resistor R15 to the input 79 of circuit 44 to which the tamper switch 78 is connected. The circuit 86 also has an input connected to the input 80 of the circuit 44 to which a microphone 22 is connected. The circuit 86 responds to various input signals of the inputs 79 or 80 which represent those conditions which are to be interpreted as attempted theft. Any number of sound, motion, or impact responsive devices may be used. Alarm condition sensing devices such as represented here as the tamper switch 78 and the microphone 22 are typical and intended as examples of many which may be employed.

The sound signal detected by the microphone 22 is input through the lead 80 to the circuit 86 is amplified by the amplifier U2A after passing through the AC coupling capacitor C3. The junction of the capacitor C3 with the input terminal 80 is connected through a resistor R16 to the arming signal line 77. The other terminal of the capacitor C3 is connected to the positive input of the amplifier U2A and also through a resistor R5 to the ground lead 70. The negative input of the amplifier U2A is connected through resistor R4 to the ground lead 70, and also through a feedback resistor R6 to the output of the amplifier U2A. The output of the amplifier U2A is connected to the positive input of a comparator amplifier U2B, which has its negative input connected to the wiper terminal of a variable resistor R8 which is connected in series with a fixed resistor R7 between the armed voltage terminal 77 and the ground terminal 70. The variable resistor R8 and fixed resistor R7 establish the sensitivity of the alarm circuit to sound. The positive and negative power terminals of the amplifier U2B, as with those of the amplifier U2A are connected to the arming signal line 77 and ground 70, respectively.

The output of the amplifier U2B is connected to the clock input of a flip-flop U3A to set the flip-flop U3A. This clock input is also connected through a resistor R9 to the arming signal line 77 and through a capacitor C7 to the ground lead 70. The SET input of the flip-flop U3A is connected to the junction of the resistor R15 and a resistor R17. The resistors R15 and R17 are connected in series between the tamper switch input 79 and the ground lead 70. The Q output of the transistor flip flop U3A is connected through a resistor R10 to the clock input of the flip flop U3B. This clock input is also connected through a capacitor C4 to the ground lead 70 and to the cathode of a diode D7. The anode of the diode D7 is connected to the Q output of the transistor flip flop U3A. The capacitor C4 and the resistor R10 constitute an RC timing circuit which delays the setting of the flip-flop U3B for 20 seconds after the generation of the output signal on output Q of the transistor flip-flop U3A.

The Q output of the flip-flop U3B is connected to the output 87 of the detector circuit 86 which is connected to an input 88 of horn driver circuit 89, and to an input 91 of lamp driver circuit 90. The circuit 89 operates to energize the horn 25 until a capacitor C5 is charged enough to trigger a reset circuit 92 in the circuit board 44. The timed delay of the reset circuit 92 is set at approximately 2 minutes and is determined by the value of the components which include the capacitor C5 connected between the ground terminal 70 and the two inputs of a NAND gate U1C. The inputs of NAND gate U1C which are connected together and through a resistor R11 to the output 87 of the detector circuit 86. The output 87 of circuit 86 is also connected, within the reset circuit 92, to the anode of a diode of a diode D8 which has its cathode connected to the inputs of the gate U1C. The output of the NAND gate U1C is connected to an input of a NAND gate U1D which has its other input connected to the junction of capacitor C2 and resistor R3. The output of the NAND gate U1D is connected to the RESET inputs of the flip flops U3A and U3B of the detector circuit 86.

The horn driver circuit 89 also has an input 93 to which the output of amplifier U2B of the circuit 86 is connected, and an input 94 which is connected through the panic switch 28 to the positive voltage line 71. The horn 25 is thereby actuated either by activation of the panic switch 28 or by a signal from the detector circuit 86. The input 88 is connected to the cathode of the diode D2 which is connected through a resistor R19 to the base of transistor Q2 which has its collector connected through the terminal 72 to the horn 25 and its emitter connected to the common ground terminal 70. The base of the transistor Q2 is also connected through a resistor R20 to the common terminal 70. The input 93 of the circuit 89 is connected to the cathode of a diode D3, the anode of which is connected also through resistor R19 to the base of transistor Q2. The input 94 of the circuit 89 is connected to the cathode of a diode D9 which is also connected through the resistor 19 to the base of transistor Q2. The input 93 of circuit 89 is further connected to the cathode of diode D4 which has its anode connected to the input 94 of the circuit 89.

The lamp driver circuit 90 includes a lamp pulsing circuit which causes the lamp 26 to flash on and off when in alarm condition. This pulsing is timed by the timer circuit U4 to which is connected the timing capacitor C9. The circuit U4 has a ground terminal connected to the ground lead 70, a power terminal connected to the positive lead 71, and an output connected to the collector of a transistor Q3 and through the terminal 81b of the circuit board 44 by which it is connected through the B terminals 54b of the push-button switch 54 and through a resistor R21 to the emitters of transistor Q3. The emitter of transistor Q3 is also connected through a resistor R22 to the panic switch input 76 of the circuit board 44, is also connected through a resistor R23 to the ground terminal 70, and is further connected to the base of transistor Q4. The transistor Q3 has its base connected through a resistor R24 to the input 91 from the detector circuit 86. Transistor Q4 has its collector connected to the terminal 73 of circuit board 44 which connects to the lamp 26, and also to the input 81a of the circuit board 44 from which it is connected through the A terminals 54a of the switch 54 to the common ground conductor 70. The emitter of transistor Q4 is connected to the ground conductor 70.

To enhance the audio range of the alarm, there is optionally provided an external siren 97 connectable to the battery 98 of the vehicle and mountable to the exterior of the vehicle 12, preferably in the engine compartment thereof. The siren is connected to an audio detector 99 which responds to an output from the horn 25 to similarly activate the siren 97, without any physical or electrical connection to the device 10.

The present invention may also be used to enhance the security of a vehicle equipped with an installed or built-in anti-theft alarm system. Such a vehicle would be provided with an alarm system 97a having an output enunciator such as the siren 97, which may be the vehicle horn or other sounding device, which sounds when a tampering or attempted theft of the vehicle is detected. With such a system, the microphone 22 of the alarm circuit 44 would receive sound from the siren 97. A filter circuit 22a would provide for detection of the siren sound, and only the siren sound, triggering the alarm to activate the horn 25 and energize the light 26. The circuit 44 would be provided with a timer 72a in the line 72 to terminate the activation of the horn 25 and light 26 after a predetermined period of time, for example two minutes. If the siren 97 is silent at the end of the two minute period, the horn 25 and light 26 would be turned off, but if the siren 97 is still sounding, the horn 25 and light 26 would remain energized. In this manner, it would be difficult for the thief to disable the installed alarm 97a or drive the vehicle away with the steering wheel locked against rotation. Thus, the thief would be likely to abandon the theft effort.

Figure 10:
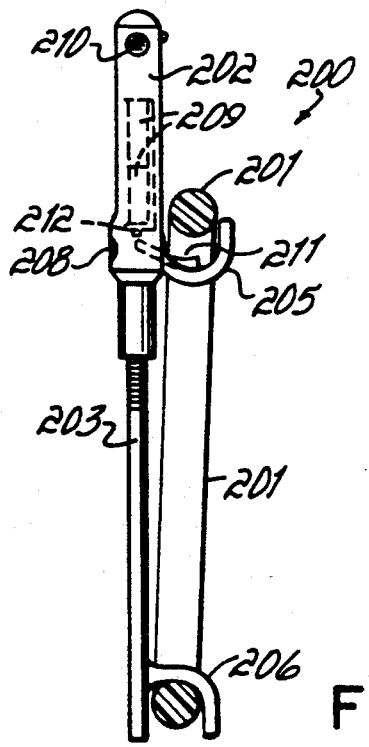
FIG. 10 is a diagram of a system embodying an automatic arming feature of the invention.

In a further embodiment of the invention illustrated in FIG. 10, a steering wheel lock having an alternative configuration to that of FIG. 1 is illustrated. In this device, a bar 200 is locked to the steering wheel 201 in a diametric manner. The bar 200 includes two parts, a hollow alarm portion 202 and a slide bar portion 203. Both portions have a hook thereon, 205, 206 respectively, to engage the steering wheel 201 from the inside. The slide portion 203 is slidably mounted in a hole in the inner end of the alarm portion 202 and is provided with a ratchet locking structure to allow it to be extended to spread the hooks and tighten the bar 200 onto the steering wheel 201. A lock 208 is provided to release the ratchet and unlock the bar from the wheel 201 with the use of a key.

In the embodiment of FIG. 10, an alarm circuit (not shown), within a hollow interior of the alarm portion 202 of the bar 200 is energized by batteries 209, also contained in the interior of the alarm portion 202, and activates a siren 210 when triggered in response to a theft attempt as with the other embodiments described above. An arming lever 211 is provided within the curve of the hook 205 of the alarm portion 202, spring biased away from the hook 205, and positioned to activate an arming switch 212 when the bar 200 is tightened onto the steering wheel 201. When the bar 200 is removed from the steering wheel 201, after the unlocking of the lock 208 and retraction of the slide portion 203, the lever 211 pivots away from the hook 205 and releases the switch 212, disarming the alarm.

Figure 10A:
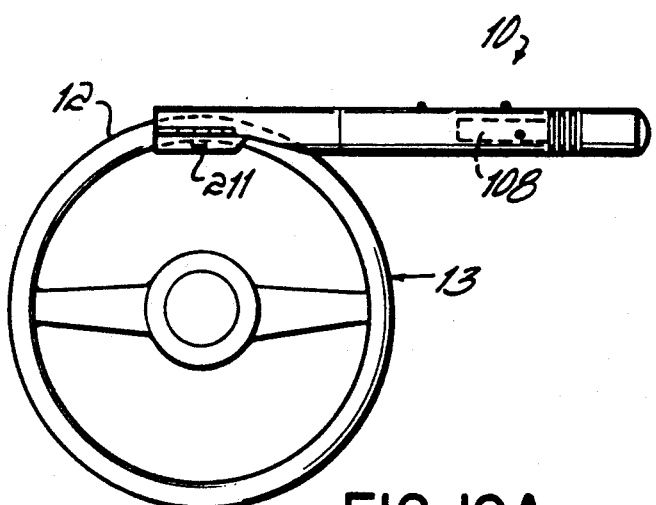
FIG. 10A is another embodiment of the invention with the arming feature of FIG. 10.

The embodiment of FIG. 10A, in which the bar is configured as that of FIG. 1, the alarm arming mechanism is the same as that of FIG. 10, except that the switch lever 211 is within the hinged semi-cylindrical clamp portion 34 of the bar 10.

While the switch 53 is described as a push-button switch, it may be replaced by, or operate in series with, a switch contained in the housing 43 adjacent the lock 20, or by a remote arming device.

As so connected, when the push-button 54 is pushed once, the contacts 54a close which causes the driver circuit 90 to continuously energize the lamp 26 This enables the device 10 to be used as a flashlight. A second depression of the button 54 open the contacts 54a and closes the contacts 54b. This connects the terminals 81b of the circuit 44 together activating the driver transistor Q4 through the timing circuit U4 to cause the lamp 26 to pulse. This enables the device 10 to be used as an emergency warning device with the halogen lamp 26 flashing in the same manner it would under an alarm condition but without the sounding of the horn 25 as would be the case in an alarm condition when the device is used as an automobile lock and alarm.

When the circuit 44 is armed by activation of the push-button 53 to energize the arming signal line 77, sound, if detected through the microphone 22, causes a signal to be emitted at the output of amplifier U2B which energizes the horn 25 through diode D3 of the circuit 89 and also turns on a lamp through the diode D4 of circuit 89 and resistor R22 to the base of transistor Q4. The duration of the sound detected by microphone 22 determines the length of time during which the lamp 26 and horn 25 are turned on. If tampering with the unit is detected the tamper switch 28 is activated. The switch 28 may be a mercury tamper switch which responds to motion of the device 10. Activation of the tamper switch 28 causes the alarm to sound through the horn 25 and the lamp 26 to flash and, when so activated by the tamper switch 78, the horn 25 and lamp 26 be so energized for a period of 2 minutes. This is only one of the preferred forms of operation of the output of the alarm, but many other possible schemes and arrangements may be employed.

Figure 9:
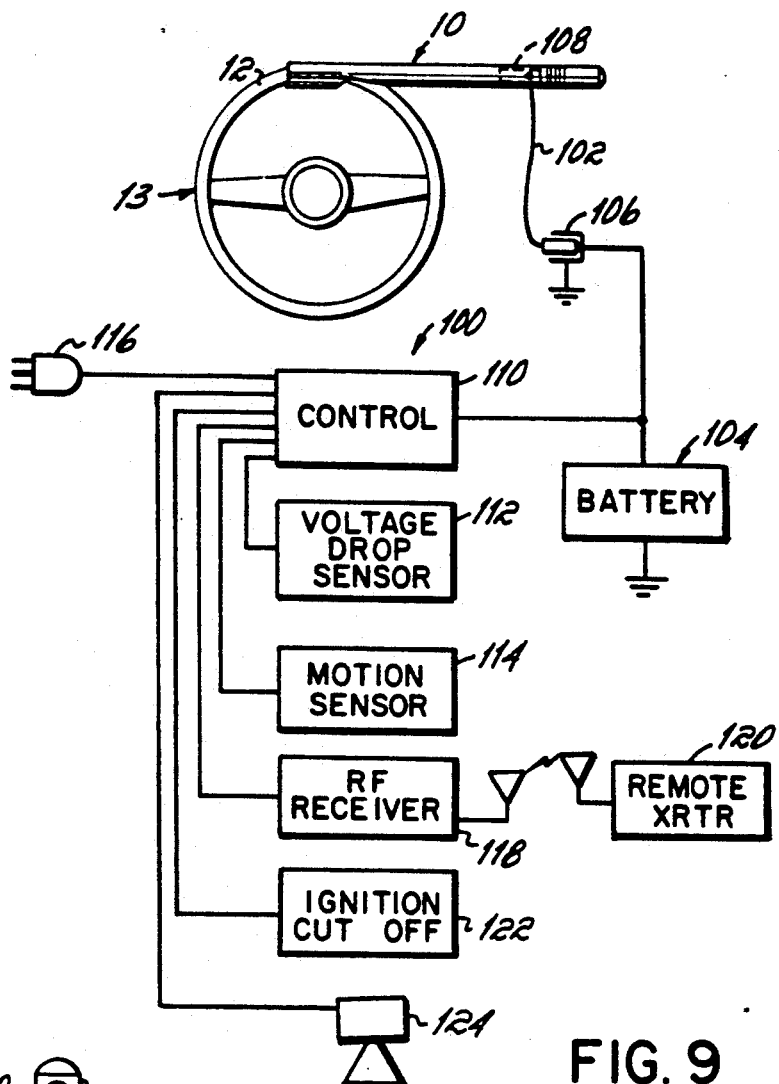
FIG. 9 is a block circuit diagram of an embodiment of the invention connected to the electric power system of the vehicle.

In the embodiment illustrated diagrammatically in FIG. 9, the device 10 is attached to the rim 12 of the steering wheel 13, and is provided in combination with additional alarm and power components 100 installed within the vehicle connectable to the device 10 through a cord 102 which connects to the vehicle electrical system 104, for example, through the vehicle cigarette lighter plug 106. Preferably, with such an embodiment, the portable device connects to electrical circuitry within the vehicle and an alarm either included in the device or installed in the vehicle, and preferably both, is functionally dependent, either for arming, disarming or activation, or powering, on the making, breaking or maintenance of the connection. Within the device 10 is provided a time delay arming circuit 108 which connects in parallel with the arming button 53 (FIG. 8) or 211 (FIG. 10A) to operate such that, when a connection of the cord 102 is made, the alarm arms automatically after a time delay of, for example, 20 seconds. In its preferred form, this embodiment includes, installed within the vehicle, a control box 110 in the vehicle engine compartment which may include a voltage drop sensor 112 connected to the vehicle 12 volt wiring to detect, for example, activation of the starter motor or fluctuations of voltage which would appear when the vehicle is running, the lights are on, or other tampering is taking place. Also, other features may be provided such as a motion sensor 114 to detect motion of the vehicle or vehicle components, an emergency flasher connection 116 to allow for the use of the vehicle's warning lights as an alarm annunciator, remote radio frequency electronics 118 by which the alarm may be either armed or disarmed in response to a signal from a hand-held transmitter unit 120, a starter or ignition cut-off switch 122, and an additional 120 db siren 124. Furthermore, the installed alarm 100 may be made responsive to disconnection of the locking device or removal of the locking device 10 from the steering wheel 13. As such, with or without the alarm on the locking device, the effectiveness of an installed alarm may be enhanced in that removal of the device is necessary for the automobile to be driven.

The remote arming feature of the embodiment of FIG. 9 may also be used with the embodiment of FIGS. 1, 2 and 8, with self-contained batteries 57 within the cavity 51. In such an embodiment, constant ability to receive a signal from the remote transmitter 120 requires constant energization of the receiver 118, which causes a draining of the batteries 57. Accordingly, it is preferable to provide such an embodiment with a remote disarming capability, and with the receiver 118a energized only in response to a detection of attempted theft by, for example, the sensor 22 (FIG. 8). Following detection, the receiver need be energized for a short time, for example two seconds, thereby conserving battery power. The two second interval is sufficient in that time need not be provided for the owner to enter the vehicle and unlock the bar 10 from the steering wheel. This increases the security of the device in that a thief has only a very short time after entering the vehicle to attempt to disable the alarm.

While certain specific and preferred embodiments are described and illustrated, it should be appreciated that various alternatives to the structure shown and described above may be employed without departing from certain of the teachings of the present invention. For example, as shown in FIGS. 3A-3C and 4A-4C. the movable clamping section 34 may be connected to the fixed section 32 other than through a longitudinal hinge and locked in a variety of ways.

Figure 3A:
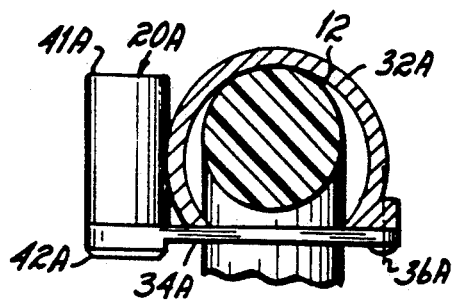
FIG. 3A is a cross-sectional view similar to FIG. 3 illustrating an alternative clamping member and locking arrangement in a locked condition.
Figure 4A:
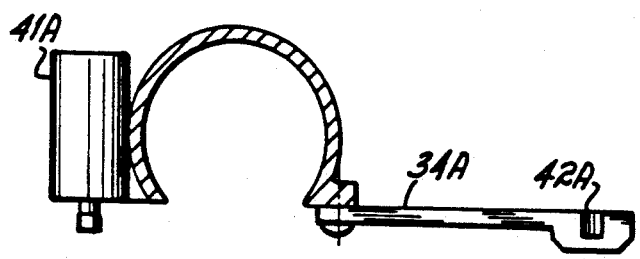
FIG. 4A is a view similar to FIG. 4 illustrating the embodiment of FIG. 3A in the unlocked condition.

For example, FIGS. 3A and 4A show a movable member 34A pivotally connected to a fixed member 32A at a transversely oriented hinge 36A' on the driver side of the rim 12 and lockable by a lock carried in housing 41A and 42A.

Figure 3B:
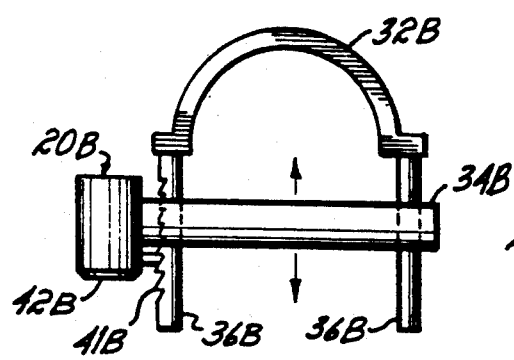
FIG. 3B is an end view of an alternative embodiment of the device of FIG. 2 illustrating a further alternative clamping member and locking arrangement in a locked condition.
Figure 4B:
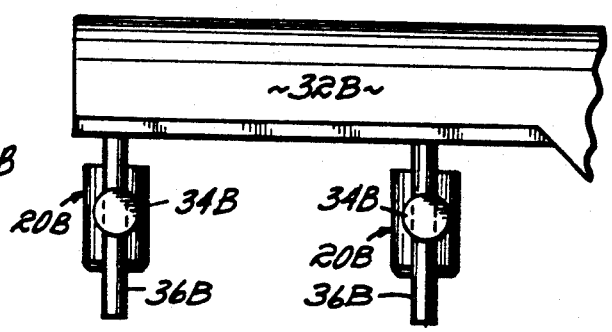
FIG. 4B is a side view similar to the alternative embodiment of FIG. 3B.

FIGS. 3B and 4B illustrate a pair of slidably movable clamping members 34B which may slide on a pair of ratchet rods 36B. Ratchet notches 41B in rods 36B cooperate with a lock 20B contained in a lock housing 42B on the members 34B to lock the member 34B to fixed member 32B in bicycle wheel lock fashion.

Figure 3C:
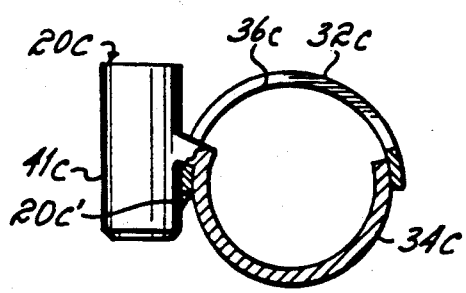
FIG. 3C is a cross-sectional view similar to FIG. 3 illustrating another alternative clamping member and locking arrangement in a locked condition.
Figure 4C:
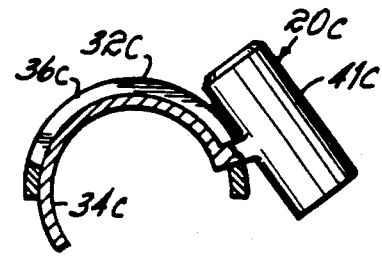
FIG. 4C is a view similar to FIG. 4 illustrating the embodiment of FIG. 3C in the unlocked condition.

FIGS. 3C and 4C show a slidable member 34C which slides on the inside of the fixed member 32C to which it is held by the lock housing 42C to which it is welded by way of a rib which extends through a circumferential slot 36C in the wall of the fixed member 41C. The lock housing 41C serves as a handle to slide the slidable clamping member 34C circumferentially between its closed position (FIG. 3C) and its open position (FIG. 4C). Upon movement of the slidable member 34C to the closed or clamped position of FIG. 4C, a spring loaded latch 20C' of the lock 20C snaps outwardly from the housing 41C about the edge of the member 32 to lock the members 32C and 34C in the closed or clamped position of FIG. 3C. Activation of the lock 20C within the housing 41C by a key or other means is required to unlock the members 32C and 34C to move the member 34C to its open position of FIG. 4C.

From the above description, it will be appreciated that only certain of many possible embodiments are illustrated and described.

Accordingly, the following is what is claimed:

1. A vehicle portable anti-theft device lockable to a steering wheel of a vehicle for limiting the angle of rotatability of the steering wheel to thereby limit the drivability of the vehicle, the device comprising:

a rigid bar having first and second opposite ends;

means for locking a section of the bar to the steering wheel so that at least one end thereof projects outward of the steering wheel a distance sufficient to limit the angle of rotatability of the steering wheel;

an electrically powered alarm carried by the bar and including means for detecting a disturbance caused by an attempted theft, and means for generating an alarm signal in response to the detected disturbance; and means at least partially carried by the bar for preventing the alarm from generating the alarm signal in response to a detectable disturbance so as to permit an authorized person to move between the inside and outside of the vehicle without generating an alarm signal.

2. The device of claim 1 wherein:
the alarm includes light generating means for generating light of sufficient intensity to brightly illuminate the interior of the vehicle in response to the alarm signal.

3. The device of claim 1 wherein:
the alarm further includes at least one annunciator responsive to said alarm signal.

4. The device of claim 3 wherein:
a source of electrical energy, sufficient to power the detecting means and the annunciator, fully carried by the bar.

5. The device of claim 1 wherein:
the alarm includes sound generating means for generating a high intensity sound in the interior of the vehicle in response to the alarm signal.

6. The device of claim 1 wherein:
the disturbance detecting means includes means responsive to disturbances selected from the group of sound, vibration, impact on the device, and motion of the device.

7. The device of claim 1 wherein the device is attachable to the steering wheel with the locking means on the side of the steering wheel opposite the driver.

8. The device of claim 1 wherein the device is attachable to the top of the steering wheel and visible from the outside of the vehicle.

9. The device of claim 1 wherein the device is attachable to the steering wheel so as to be visible from the outside of the vehicle and has mounted thereon a flashing light to enhance the visibility of the device.

10. The device of claim 1 wherein the bar has therein interior space of sufficient volume and dimensions to contain fully therein the alarm and batteries sufficient to adequately power the alarm.

11. The device of claim 1 further comprising a cable lockably connectable between the device and accessory of the vehicle.

12. The device of claim 1 further comprising:
a switch positioned to actuate when the device is mounted on the steering wheel; and
the alarm being connected to the switch so as to be operable when the switch is actuated.

13. The device of claim 1 further comprising:
a switch carried by the bar and connected to the alarm such that the generation of the alarm signal is dependent on a setting thereof; and
the switch is positioned so as to be inaccessible when the device is locked to the steering wheel.

14. The device of claim 1 wherein:
the preventing means includes means for delaying the response of the signal generating means to the detected disturbance a time sufficient to allow for an authorized person to enter the vehicle and disarm the alarm.

15. The device of claim 1 wherein the preventing means includes:
an alarm arming actuator positioned on the bar; and
means for delaying the arming of the alarm a sufficient time from the operation of the alarm arming actuator to allow for a departure of a person arming the alarm from the vehicle.

16. The device of claim 1 wherein the preventing means includes:
an alarm arming actuator positioned on the bar; and
a receiver positioned on the bar for generating a control signal for operating the actuator in response to a transmitted signal;
and a remote transmitter for transmitting a signal to the receiver for enabling the authorized person to operate the alarm actuator from outside the vehicle.

17. The device of claim 1 further comprising:
an alarm annunciator, external to the bar, and responsive to the alarm signal.

18. A vehicle portable anti-theft device lockable to a steering wheel of a vehicle for limiting the angle of rotatability of the steering wheel to thereby limit the drivability of the vehicle, the device comprising:
a rigid bar having first and second opposite ends;
means for locking a section of the bar to the steering wheel so that at least one end thereof projects outward of the steering wheel a distance sufficient to limit the angle of rotatability of the steering wheel;
an electrically powered alarm carried by the bar an including means for detecting a disturbance caused by an attempted theft, and means for generating an alarm signal in response to the detected disturbance; and
a manually operable alarm disarming actuator positioned on the bar and accessible only when the device is removed from the steering wheel and inaccessible when the device is locked to the rim.

19. The device of claim 18 wherein:
the section of the bar which is locked by the locking means to the steering wheel includes a moveable member which closes about the steering wheel and encloses the actuator when the section is locked by the locking means to the steering wheel, and
the bar includes an actuator access shield positioned on said section of the bar for blocking access to the actuator from between the steering wheel and the bar locked thereto.

20. The device of claim 18 further comprising:
means for delaying the response of the signal generating means to the detected disturbance a time sufficient to allow for the unlocking of the locking means and the operation of the alarm disarming actuator to disable the alarm.

21. A vehicle portable anti-theft device lockable to a steering wheel of a vehicle for limiting the angle of rotatability of the steering wheel to thereby limit the drivability of the vehicle, the device comprising:
a rigid bar having first and second opposite ends;
means for locking a section of the bar to the steering wheel so that at least one end thereof projects outward of the steering wheel a distance sufficient to limit the angle of rotatability of the steering wheel;

an electrically powered alarm carried by the bar and including means for detecting a disturbance caused by an attempted theft, and means for generating an alarm signal in response to the detected disturbance,
an alarm arming actuator positioned on the bar, and
means for delaying the arming of the alarm sufficient time from the operation of the alarm arming actuator to allow for the locking of the locking means to the steering wheel and a departure of the person arming the alarm from the vehicle.

22. A vehicle portable anti-theft device lockable to a steering wheel of a vehicle for limiting the angle of rotatability of the steering wheel to thereby limit the drivability of the vehicle, the device comprising:
a rigid bar having first and second opposite ends;
means for locking a section of the bar to the steering wheel so that at least one end thereof projects outward of the steering wheel a distance sufficient to limit the angle of rotatability of the steering wheel;
an electrically powered alarm carried by the bar and including means for detecting a disturbance caused by an attempted theft, and means for generating an alarm signal in response to the detected disturbance; and
an alarm arming and disarming actuator responsive to the respective locking and unlocking of the locking means.

23. A vehicle portable anti-theft device lockable to a steering wheel of a vehicle for limiting the angle of rotatability of the steering wheel to thereby limit the drivability of the vehicle, the device comprising:
a rigid bar having first and second opposite ends;
means for locking a section of the bar to the steering wheel so that at least one end thereof projects outward of the steering wheel a distance sufficient to limit the angle of rotatability of the steering wheel;
an electrically powered alarm carried by the bar and including means for detecting a disturbance caused by an attempted theft, and means for generating an alarm signal in response to the detected disturbance; and
means for remotely disarming the alarm.

24. A vehicle portable anti-theft device lockable to a steering wheel of a vehicle for limiting the angle of rotatability of the steering wheel to thereby limit the drivability of the vehicle, the device comprising:
a rigid bar having first and second opposite ends;
means for locking a section of the bar to the steering wheel so that at least one end thereof projects outward of the steering wheel a distance sufficient to limit the angle of rotatability of the steering wheel;
an electrically powered alarm carried by the bar and including means for detecting a disturbance caused by an attempted theft, and means for generating an alarm signal in response to the detected disturbance; and
the alarm includes a lamp illuminated in response to the alarm signal; and
the device further comprises manual operable means for selectively energizing the lamp so that the device may function alternatively as a flashlight.

25. A vehicle portable anti-theft device lockable to a steering wheel of a vehicle for limiting the angle of rotatability of the steering wheel to thereby limit the drivability of the vehicle, the device comprising:

a rigid bar having first and second opposite ends;

means for locking a section of the bar to the steering wheel so that at least one end thereof projects outward of the steering wheel a distance sufficient to limit the angle of rotatability of the steering wheel;

an electrically powered alarm carried by the bar and including means for detecting a disturbance caused by an attempted theft, and means for generating an alarm signal in response to the detected disturbance;

the alarm including sound generating means for generating a high intensity sound in the interior of the vehicle in response to the alarm signal;

the alarm including primary sound generating means for generating a high intensity sound in the interior of the vehicle in response to the alarm signal; and secondary sound generating means, including an audio sensor, physically separate from the device and mountable on the exterior of the vehicle for generating a high intensity sound exterior of the vehicle in response to the sound generated by the primary sound generating means.

26. A vehicle portable anti-theft device lockable to a steering wheel of a vehicle for limiting the angle of rotatability of the steering wheel to thereby limit the drivability of the vehicle, the device comprising:

a rigid bar having first and second opposite ends;

means for locking a section of the bar to the steering wheel so that at least one end thereof projects outward of the steering wheel a distance sufficient to limit the angle of rotatability of the steering wheel;

an electrically powered alarm carried by the bar and including means for detecting a disturbance caused by an attempted theft, and means for generating an alarm signal in response to the detected disturbance;

the alarm including sound generating means for generating a high intensity sound in the interior of the vehicle in response to the alarm signal;

the locking means including means for securing the alarm from deactivation when the device is locked to the steering wheel; and the disturbance detecting means being responsive to disturbances associated with attempts to remove the device from the steering wheel when locked thereto.

27. An anti-theft system for vehicles including the device of claim 1 or claim 20 or claim 21 or claim 23 or claim 26 and further comprising:

means for making a detachable electrical connection of the device to the electrical system of the vehicle; and the alarm being responsive to electrical changes sensed in the vehicle electrical system.

28. The system of claim 27 wherein:

the alarm includes components installed in the vehicle.

29. The device of claim 27 wherein the alarm means is responsive to a voltage drop in the vehicle electrical system caused by a disturbance from the group consisting of a running engine, engine ignition, turning on of vehicle lights, or disconnection of the device from the electrical system.

30. The device of claim 27 wherein:

the alarm is responsive to disconnection of the device from the electrical system.

31. A vehicle portable anti-theft device lockable to a steering wheel of a vehicle for limiting the angle of rotatability of the steering wheel to thereby limit the drivability of the vehicle, the device comprising:

a rigid bar having first and second opposite ends;

means for locking a section of the bar to the steering wheel so that at least one end thereof projects outward of the steering wheel a distance sufficient to limit the angle of rotatability of the steering wheel;

an electrically powered alarm carried by the bar and including means for detecting a disturbance caused by an attempted theft, and means for generating an alarm signal in response to the detected disturbance;

the alarm including sound generating means for generating a high intensity sound in the interior of the vehicle in response to the alarm signal;

the alarm including a lamp and a lamp flashing circuit for flashing the lamp in response to the alarm signal; and manual operable means for selectively energizing the lamp flashing circuit so that the device may function alternatively as an emergency warning light.

32. The device of claim 31 further comprising a stand attachable to the bar for supporting the device; and a lens cover positionable over the lamp modifying the light from the lamp.

33. A vehicle portable anti-theft device lockable to a steering wheel of a vehicle for limiting the angle of rotatability of the steering wheel to thereby limit the drivability of the vehicle, the device comprising:

a rigid bar having first and second opposite ends;

means for locking a section of the bar to the steering wheel so that at least one end thereof projects outward of the steering wheel a distance sufficient to limit the angle of rotatability of the steering wheel;

an electrically powered alarm carried by the bar and including means for detecting a disturbance caused by an attempted theft, and means for generating an alarm signal in response to the detected disturbance;

the alarm including sound generating means for generating a high intensity sound in the interior of the vehicle in response to the alarm signal; and a manually accessible actuator for triggering the alarm to generate the alarm signal.

34. An anti-theft system for vehicles comprising:

a portable anti-theft device for vehicles having an electrical system and a steering wheel to which the device can be locked;

said device including means for removeably attaching the device to the steering wheel of the vehicle and locking the device to the steering wheel with a part of the device projecting from the steering wheel to limit the rotatability of the steering wheel relative to the internal structures of the vehicle to thereby limit the drivability of the vehicle, and means for making a detachable electrical connection of the device to the electrical system of the vehicle; and alarm means responsive to electrical changes sensed in the electrical system of the vehicle;

the alarm means including alarm circuit components installable in the vehicle and including circuitry responsive to an attempted disconnection of the device from the vehicle for generating an alarm signal.

35. A vehicle portable anti-theft device lockable to a steering wheel of a vehicle for limiting the angle of rotatability of the steering wheel to thereby limit the drivability of the vehicle, the device comprising:
a rigid bar having first and second opposite ends;
means for locking a section of the bar to the steering wheel so that at last one end thereof projects outward of the steering wheel a distance sufficient to limit the angle of rotatability of the steering wheel;
an electrically powered alarm carried by the bar and including means for detecting a disturbance caused by an attempted theft, and means for generating an alarm signal in response to the detected disturbance;
alarm circuit components, separate from components of the device installable in the vehicle and including circuitry responsive to an attempted disconnection of the device from the vehicle for generating an alarm signal.

36. The system of claim 35 further comprising:
means for arming at least one of the alarm of the device and the alarm circuit components in response to the connection of the device to the vehicle.

37. The system of claim 36 wherein:
the arming means is operative to an arm the alarm carried by the device.

38. An anti-theft device for vehicles comprising:
a portable anti-theft device for vehicles having an electrical system and a steering wheel to which the device can be locked;
said device including means for removeably attaching the device to the steering wheel of the vehicle and locking the device to the steering wheel with a part of the device projecting from the steering wheel to limit the rotatability of the steering wheel relative to the internal structures of the vehicle to thereby limit the drivability of the vehicle, and means for making a detachable electrical connection of the device to the electrical system of the vehicle;
an alarm responsive to electrical changes sensed in the electrical system of the vehicle; and
means for arming the alarm in response to the connection of the device to the electrical system of the vehicle.

39. An anti-theft system for vehicles comprising:
a portable anti-theft device for vehicles having an electrical system and a steering wheel to which the device can be locked;
said device including means for removeably attaching the device to the steering wheel of the vehicle and locking the device to the steering wheel with a part of the device projecting from the steering wheel to limit the rotatability of the steering wheel relative to the internal structures of the vehicle to thereby limit the drivability of the vehicle, and means for making a detachable electrical connection of the device to the electrical system of the vehicle; and
alarm means responsive to electrical changes sensed in the electrical system of the vehicle;
means for arming and disarming the alarm means;

means installed in the vehicle for receiving a remotely generated signal and for activating the arming and disarming means in response to the remotely generated signal; and
a remote portable transmitter for generating the remotely generated signal.

40. A vehicle portable anti-theft device lockable to a steering wheel of a vehicle for limiting the angle of rotatability of the steering wheel to thereby limit the drivability of the vehicle, the device comprising:
a rigid bar having first and second opposite ends;
means for locking a section of the bar to the steering wheel so that at least one end thereof projects outward of the steering wheel a distance sufficient to limit the angle of rotatability of the steering wheel;
an electrically powered alarm carried by the bar and including means for detecting a disturbance caused by an attempted theft, and means for generating an alarm signal in response to the detected disturbance;
a source of electrical energy sufficient to power the detecting means contained within the bar;
a flashing light on the device visible from the outside of the vehicle when mounted on a steering wheel and electrically connected to the source electrical energy; and
a photocell connected in a circuit with the light and source so as to cause the light to be energized by the source in response to the detection of ambient light below a predetermined ambient light level.

41. A vehicle portable anti-theft device lockable to a steering wheel of a vehicle for limiting the angle of rotatability of the steering wheel to thereby limit the drivability of the vehicle, the device comprising:
a rigid bar having first and second opposite ends;
means for locking a section of the bar to the steering wheel so that at least one end thereof projects outward of the steering wheel a distance sufficient to limit the angle of rotatability of the steering wheel;
an electrically powered alarm carried by the bar and including means for detecting a disturbance caused by an attempted theft, and means for generating an alarm signal in response to the detected disturbance;
a source of electrical energy sufficient to power the detecting means contained within the bar;
means for remotely disarming the alarm including a disarming signal receiver; and
means for electrically energizing the disarming signal receiver from said source in response to a detection of a disturbance by the detecting means.

42. A vehicle portable anti-theft device lockable to a steering wheel of a vehicle for limiting the angle of rotatability of the steering wheel to thereby limit the drivability of the vehicle, the device comprising:
a rigid bar having first and second opposite ends;
means for locking a section of the bar to the steering wheel so that at least one end thereof projects outward of the steering wheel a distance sufficient to limit the angle of rotatability of the steering wheel;
an installed theft detection system electrically connected to a power system of the vehicle;
the detection system including an alarm condition sounding annunciator responsive to a disturbance caused by an attempted theft; and an electrically powered alarm carried by the bar and including means responsive to the sounding of the annunciator for generating an alarm signal at the bar.

43. A vehicle portable anti-theft device lockable to a steering wheel of a vehicle for limiting the angle of rotatability of the steering wheel to thereby limit the drivability of the vehicle, the device comprising:

a rigid bar having first and second opposite ends having a sealed cavity therein;

means for locking a section of the bar to the steering wheel so that at least one end thereof projects outward of the steering wheel a distance sufficient to limit the angle of rotatability of the steering wheel; and the cavity being adapted to contain a pressurized personnel repellant gas releasable into the vehicle upon cutting of the bar;

the release of the gas being independent of detection of an alarm condition in response to a detected disturbance.

44. The device of claim 43 wherein:

the sealed cavity is a canister of the personnel repellant gas from which the gas is releasable into the vehicle upon cutting of the bar.

* * * * *